Sept. 14, 1965
N. L. SICOTTE
3,205,952
PORTABLE WELL-DRIVING RIG
Filed Nov. 13, 1961
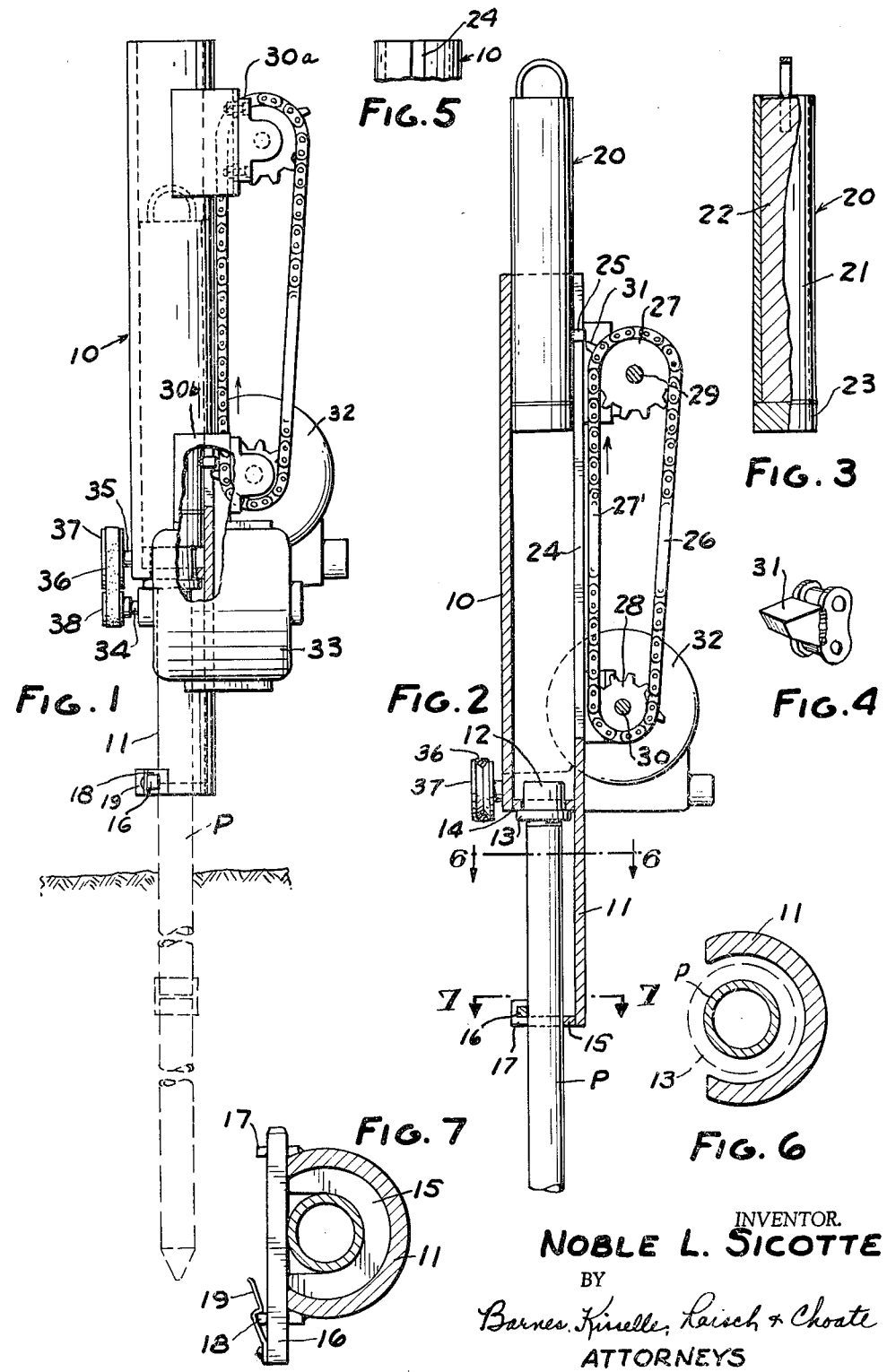
INVENTOR.
NOBLE L. SICOTTE
BY
Barnes, Kisselle, Raisch & Choate
ATTORNEYS 3,205,952
PORTABLE WELL-DRIVING RIG
Noble L. Sicotte, Star Rte. 550, Marquette, Mich.
Filed Nov. 13, 1961, Ser. No. 151,793
7 Claims. (Cl. 173—124)

This invention relates to the driving of pipes and the like in connection with the drilling of wells.

It is an object of this invention to provide a low-cost, long life portable driving rig which will effectively drive a pipe or the like into the ground in an efficient and economical manner.

In the drawings:

FIG. 1 is a part sectional elevation of the well-driving rig embodying the invention.

FIG. 2 is a sectional view similar to FIG. 1, parts being broken away, showing the parts in a different operative position.

FIG. 3 is a part sectional elevational view of the driving plunger used in the well-driving rig.

FIG. 4 is a perspective view of a portion of the endless power element used in the well-driving rig.

FIG. 5 is a fragmentary side elevation of the upper end of the cylinder used in the well-driving rig.

FIG. 6 is a sectional view taken along the line 6—6 in FIG. 2.

FIG. 7 is a sectional view taken along the line 7—7 in FIG. 2.

Referring to the drawings, the well-driving rig embodying the invention comprises a cylinder 10 which has open lower and upper ends. As shown in FIGS. 1 and 2, a portion 11 of the lower end of the cylinder 10 is cut away to facilitate the mounting of the cylinder 10 on the upper end of the length of pipe P. A cap 12, provided with a peripheral flange 13, is threaded on the upper end of the pipe. The rig is provided with a ring 14 welded to the cylinder adjacent the upper end of the cut-away portion 11 so that when the cylinder 10 is mounted on the upper end of the pipe the ring 14 engaging the flange 13 of the cap 12. In this manner, the cylinder 10 is restrained from movement downwardly but unrestrained from movement upwardly, as presently described. Lateral stability is provided to the cylinder 10 by an arrangement which includes a C-shaped flange 15 welded to the lower end of the cut-away portion 11 and a pin 16 extending through the holes of brackets 17, 18 welded to the cut-away portion 11. The pin 16 surrounds the pipe P and thereby provides lateral stability to the cylinder 10. A spring latch 19 on pin 16 is adapted to engage the exterior of the bracket 18 to lock the pin 16 in position.

A driving plunger 20 is adapted to be inserted through the open upper end of the cylinder 10 and is vertically reciprocable in the cylinder. As shown in FIG. 3, the plunger 20 comprises a hollow tube 21 filled with a heavy material such as lead 22 and having a hardened end cap 23 which serves as a driving end to the plunger.

Means are provided for periodically elevating the plunger 20 and then releasing it so that it falls by gravity and engages the upper end of the cap 12 driving the pipe P into the ground. As shown in the drawings, this comprises a vertically extending slot 24 in the side wall of the cylinder 10 extending upwardly through the upper edge of the cylinder. A lug 25 welded to the side of the plunger 20 extends through the slot. An endless chain 26 is trained over sprockets 27, 28 which are fixed to shafts 29, 30 journalled in brackets 30a, 30b on the cylinder 10. Chain 26 is mounted so that one reach 27' thereof extends parallel to the slot 24. Lugs 31 are provided on certain links of the chain 26 (FIG. 4) and are adapted to engage the lug 25 on the plunger 20 to elevate the plunger 20.

As shown in FIG. 1, as the chain 26 is driven clockwise, a lug 31 on chain 26 engages the lug 25 on the plunger 20, the plunger is moved upwardly to the position shown in FIG. 2. As the lug 31 on chain 26 travels around the sprocket 27 it clears the lug 25 on the plunger 20 permitting the plunger 20 to move downwardly under the action of gravity and drive the pipe P into the ground.

The shaft 30 comprises the output shaft of the gear box 32 fixed on one side of the cylinder 10 and driven by a motor 33 fixed on the other side of the cylinder 10. The output shaft 34 of the motor 33 extends generally parallel to the plane of the chain 26. The input shaft 35 of the gear box 32 is parallel to the shaft 34. An endless belt 36 is trained over pulleys 37, 38 on the shafts 35, 34, respectively.

By this drive arrangement, the weight of the mechanism on the cylinder 10 is equally distributed providing for a balanced construction.

When the rig is mounted in position on a pipe P and the motor 33 is energized, the plunger 20 is periodically elevated and disengaged so that it can fall by gravity into the cap 12 and, in turn, drive the pipe P. Since the cylinder 10 is mounted on the pipe in such a manner that it is restrained from downward movement but unrestrained from upward movement and since the plunger 20 moves downwardly into direct engagement with the upper end of the pipe P through the cap 12, the shock of driving the pipe P is transmitted directly to the pipe rather than through the frame to the pipe. This provides for a longer life and a more efficient operation of the well-driving rig. As one length of pipe is driven into the ground, another length of pipe may be connected thereto and driven into the ground.

I claim:

1. A portable well-driving rig for driving a length of pipe or the like into the ground which comprises an open-ended cylinder, said cylinder having a portion adjacent the lower end thereof cut away, means adjacent the lower end of said cut-away portion and adapted to surround the length of pipe, means adjacent the upper end of said cut-away portion providing a radially inwardly extending flange adapted to engage the flange of a cap provided on the upper end of the pipe thereby restraining the cylinder against downward movement, a plunger adapted to be reciprocated in said cylinder, said cylinder having a slot extending vertically therethrough, a lug on said plunger extending into said slot, an endless drive member supported on said cylinder with a reach thereof extending adjacent said slot, a means on said cylinder for driving said endless drive member a lug on said endless drive member adapted to engage the lug on said plunger, and elevate the plunger and thereafter to move past the lug on said plunger to release the plunger for vertical downward movement under the action of gravity into contact with the cam member on said pipe.

2. A portable well-driving rig for driving a length of pipe or the like into the ground which comprises an open-ended cylinder, said cylinder having a portion adjacent the lower end thereof cut away, means adjacent the lower end of said cut-away portion and adapted to surround the length of pipe, means adjacent the upper end of said cut-away portion providing a radially inwardly extending flange adapted to engage the flange of a cap provided on the upper end of the pipe thereby restraining the cylinder against downward movement, a plunger adapted to be reciprocated in said cylinder, said cylinder having a slot extending vertically therethrough, a lug on said plunger extending into said slot, an endless drive member supported on said cylinder with a reach thereof extending adjacent said slot, a lug on said endless drive member adapted to engage the lug on said plunger, and elevate the plunger and thereafter to move past the lug on said plunger to release the plunger for vertical downward movement under the action of gravity into contact with the cap member on said pipe, and means for driving said endless member comprising a gear box mounted on said cylinder, a motor mounted on said cylinder at a point generally diametrically opposite said gear box, and endless belt means extending between said motor and said gear box.

3. The combination set forth in claim 2 wherein said motor includes an output shaft extending at a generally right angle to the plane of rotation of said endless drive member, said gear box including a shaft parallel to the output shaft of said motor, the plane of said endless belt means between said motor and said gear box being at a generally right angle to the plane of said endless drive member for elevating said plunger.

4. The combination set forth in claim 3 wherein said means adjacent the lower end of said cut-off position of said cylinder comprises a flange extending radially inwardly from the lower end of said cut-off portion transversely of said cylinder and a removable lock pin closing said cut-off portion and maintaining said pipe in contact with said cut-off portion.

5. A portable well-driving rig for driving a pipe or the like into the ground comprising an open-ended cylinder, means for supporting said cylinder on said pipe adjacent the upper end of a pipe in such a manner that the entire weight of said cylinder is supported by said pipe and that the cylinder is restrained against downward movement but unrestrained against upward movement relative to said pipe, a driving plunger reciprocably mounted in said cylinder, and means mounted on said cylinder and adapted to periodically engage the driving plunger to elevate said plunger and to disengage said plunger at the upper end of the cylinder so that the plunger falls by gravity onto the top of the pipe, said means for supporting said cylinder adjacent the upper end of a pipe comprising a member adapted to be removably mounted on the upper end of said pipe, flange means on said cylinder adapted to engage said member to restrain the cylinder against downward movement on the pipe, the upper end of said member being exposed and adapted to be contacted by the plunger as it moves downwardly.

6. The combination set forth in claim 5 wherein said last mentioned means includes an extension integral with said cylinder extending downwardly beyond said flange means and adapted to provide lateral stability to said cylinder without vertical restraint of the cylinder.

7. A portable well-driving rig for driving a pipe or the like into the ground comprising an open-ended cylinder, means for supporting said cylinder on said pipe adjacent the upper end of a pipe in such a manner that the entire weight of said cylinder is supported by said pipe and that the cylinder is restrained against downward movement but unrestrained against upward movement relative to said pipe, a driving plunger reciprocably mounted in said cylinder, and means mounted on said cylinder and adapted to periodically engage the driving plunger to elevate said plunger and to disengage said plunger at the upper end of the cylinder so that the plunger falls by gravity onto the top of the pipe, said means for engaging said plunger comprising an endless drive member, means mounted exteriorly of said cylinder for driving said endless drive member, and interengaging means between said drive member and said plunger adapted to periodically engage and disengage said plunger to elevate and release said plunger, said means for periodically driving said endless drive member including a motor mounted on one side of said cylinder, a gear box mounted on the diametrically opposite side of said cylinder and endless belt means between said motor and said gear box.

References Cited by the Examiner

UNITED STATES PATENTS

| | | | |
|---|---|---|---|
| 839,246 | 12/06 | Williams | 173—90 |
| 1,062,363 | 5/13 | Schalscha | 173—131 |
| 2,487,530 | 11/49 | Dirksen | 173—53 |
| 2,557,873 | 6/51 | Jarrell | 173—115 |
| 2,599,995 | 6/52 | Hobson et al. | 173—124 |
| 2,703,479 | 3/55 | Richardson | 173—132 |
| 2,882,690 | 4/59 | Frederick | 173—124 |
| 2,975,761 | 3/61 | Fairchild | 92—84 |
| 2,988,158 | 6/61 | Baldwin | 173—132 |

FOREIGN PATENTS

| | | |
|---|---|---|
| 395,424 | 7/44 | Great Britain. |

BROUGHTON G. DURHAM, *Primary Examiner.*

CHARLES E. O'CONNELL, *Examiner.*

UNITED STATES PATENT OFFICE
CERTIFICATE OF CORRECTION

Patent No. 3,205,952 September 14, 1965

Noble L. Sicotte

It is hereby certified that error appears in the above numbered patent requiring correction and that the said Letters Patent should read as corrected below.

Column 2, line 51, after "member" insert a comma; line 56 for "cam" read -- cap --.

Signed and sealed this 31st day of May 1966.

(SEAL)
Attest:

ERNEST W. SWIDER
Attesting Officer

EDWARD J. BRENNER
Commissioner of Patents